June 30, 1964     T. L. MELL     3,139,216
AUTOMATIC CONTROL OF THE FLOW OF BULK MATERIALS ON CONVEYORS
Filed July 31, 1961     3 Sheets-Sheet 1

United States Patent Office 3,139,216
Patented June 30, 1964

3,139,216
AUTOMATIC CONTROL OF THE FLOW OF BULK MATERIALS ON CONVEYORS
Thomas L. Mell, Paoli, Pa., assignor to Trans-Weigh Company, King of Prussia, Pa., a corporation of Pennsylvania
Filed July 31, 1961, Ser. No. 128,080
13 Claims. (Cl. 222—55)

This invention relates to the automatic control of the flow of bulk materials on conveyors and has for an object the provision of a means for controlling the weight of material on the conveyor uniformly in accordance with a predetermined weight in manner such that the rate of correction in the feed of material to the conveyor is in proportion to the conveyor speed.

Systems of the type to which the present invention is applicable generally employ a conveyor to which bulk material is delivered by a feeder and the material travels a considerable distance before it reaches the discharge end of the conveyor. In systems of this type, it is customary to employ a scale associated with the conveyor which is adapted to adjust the feeder so as to control the flow of material at the discharge end of the conveyor. As is well understood by those experienced with automatic controls, the time lag for material to pass from the feeder to the scale is critical in the operation of the control applied to the feeder. If the rate of correction applied to the feeder for a given weight error is too great relative to the transportation time lag, a condition of continuous oscillation or "hunting" of the feeder will occur. The transportation time lag for material to pass from the feeder to the scale varies with the conveyor speed and thus the proper rate of correction of the feeder should also vary with belt speed. For example, a fast belt speed provides a relatively short time lag and thus the control for the feeder can be set relatively fast-acting without hunting. However, if the control response is set as fast as possible when the belt speed is high and later the belt speed is reduced, the control system will then oscillate because of the increased time delay for the material to pass from the feeder to the scale. Conversely, if the control settings are made at the time when the belt speed is slow, the control will be relatively slow-acting and thus the control action at higher belt speeds will be relatively poor as compared with faster control settings. The present invention eliminates this problem by automatically providing a corrective rate in proportion to speed.

In accordance with one form of the invention, there is provided in a system for continuously feeding material from a feeder to a continuously traveling conveyor, the improvement of means for controlling the weight of material on the conveyor uniformly in accordance with a predetermined weight. Such improvement includes a first measuring means responsive to the weight of the material on the conveyor and a second measuring means responsive to the speed of the conveyor. The improvement further provides control means operative to adjust the feeder output in a corrective direction to obtain the predetermined weight of material and compensating means effective on the control means and responsive to both of the measuring means to vary the rate of feeder correction in proportion to conveyor speed, so that the rate of feeder correction is inversely proportional to the time lag between the feeder and the first measuring means.

In one form of the invention, the compensating means comprises an electrical network in circuit with the control means. The network includes a pair of resistances across each of which there is applied a voltage directly proportional to the conveyor speed and the circuit connections between the network and the control means are such that the latter is subject to any difference in voltages across predetermined portions of the pair of resistances.

It is another object of the invention to provide control of the flow of material in ratio to a primary variable by compensation of speed and weight signals.

It is a further object of the invention to provide "anticipating" action by employing conveyor speed signals to obtain immediate feeder corrections without waiting for weight errors to appear.

For further objects and advantages of the invention and a more detailed understanding thereof, reference may be had to the following description taken in conjunction with the accompanying drawings in which.

Figure 1:
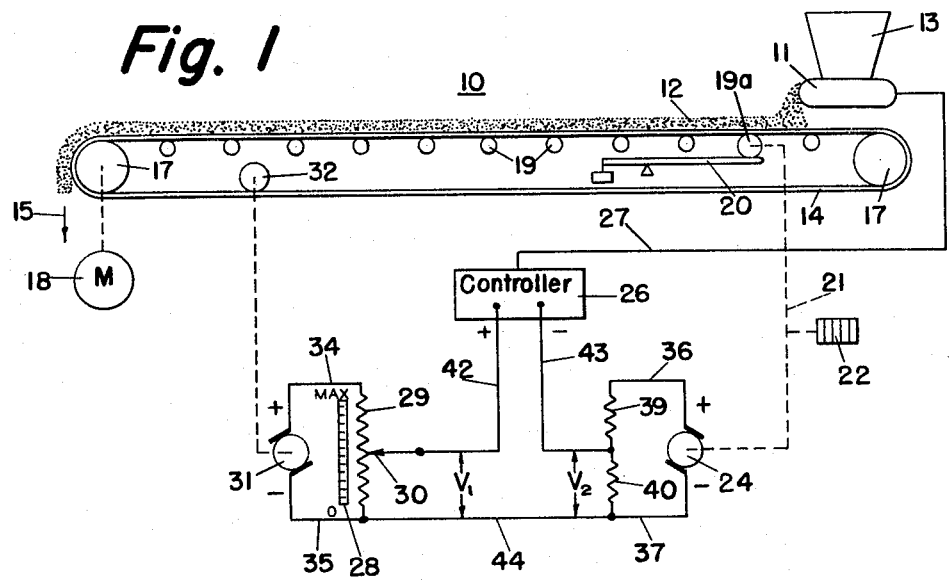
FIG. 1 is a schematic diagram of a control system embodying the present invention.
Figure 3:
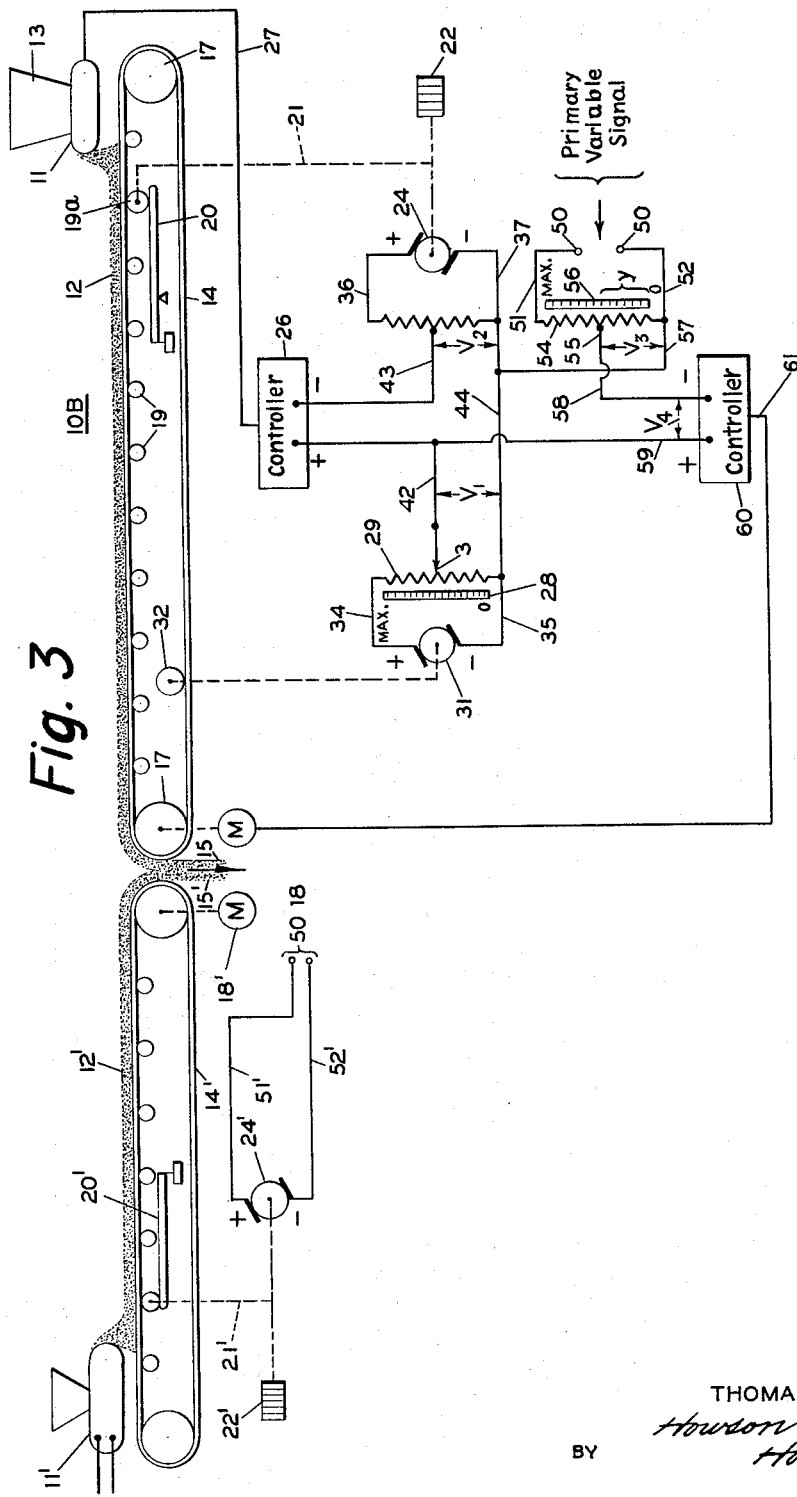
Figure 4:
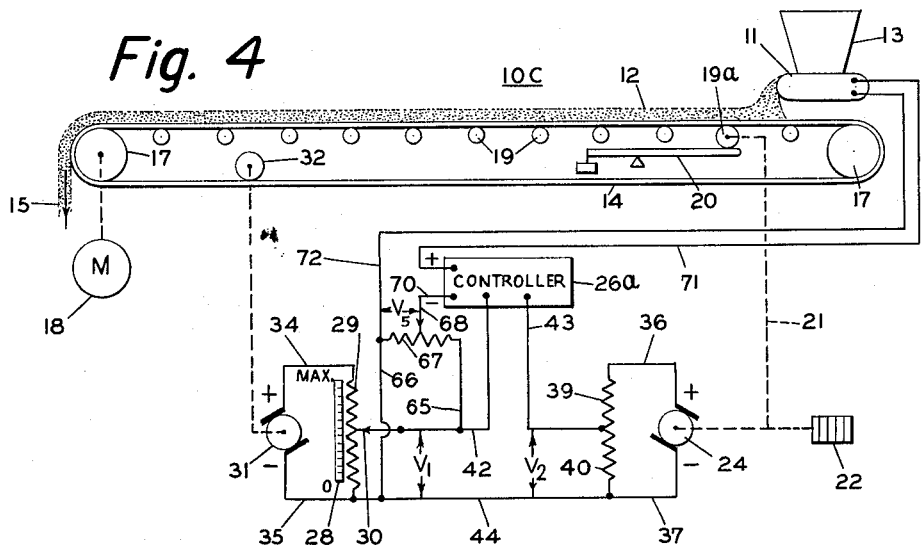
Figure 5:
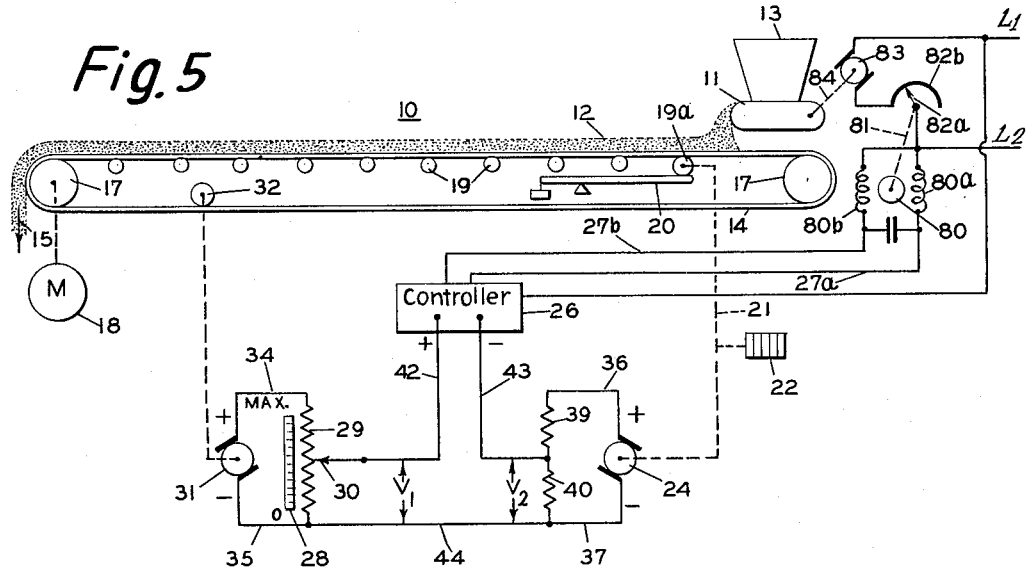

FIG. 3 schematically illustrates the present invention as applied to a ratio control system;

FIG. 4 is a schematic diagram of a control system embodying the invention and including "anticipating" action; and FIG. 5 is a schematic diagram similar to FIG. 1 but showing the control system in greater detail.

Referring to FIG. 1, there is illustrated an automatic control system 10 for the flow of bulk materials utilizing the present invention. A material feeder 11 is adapted to deliver material 12 from a hopper 13 to an endless conveyor 14 which carries the material 12 to a discharge station 15 at the discharge end of the conveyor. The feeder 11 may be of any suitable type, such, for example, as of the vibrator type, well-known in the art, where the amplitude of vibration of a trough for the material is varied by varying the resistance in the electrical circuit to vary the rate of feed of the material. The feeder 11 may also be of the endless belt type with the belt being motor driven and including control for varying the speed of rotation, to change the rate of feed of material. The conveyor 14 likewise may be of any suitable type and has been illustrated as of the type including an endless flexible belt passing over a pair of spaced pulleys or drums 17 one of which is driven from a variable speed drive motor 18. The upper face of the belt is adapted to be supported by a plurality of rotating idlers 19, one of which 19a is supported on a scale 20 which is adapted to weigh the material on the conveyor as it passes thereover. The other idlers 19 as well as the pulleys 17 are rotatably supported on the conveyor frame (not shown).

The weighing scale 20 may be of any suitable type such as the type illustrated in United States Patent No. 1,298,302—Davis. Preferably, the weighing scale 20 is of the type which rotates a shaft 21 at a speed proportional to the actual measured flow rate at the scale location, this shaft being connected to a counter 22 so that the numbers on the counter indicate the integrated or totalized quantity of material passed over the scale. The shaft 21 is connected to a tachometer generator 24 or equivalent device for producing a voltage signal proportional to the flow rate of material at the scale. It will be seen that this voltage signal will take into account both the weight and speed variables.

The feeder 11 is adapted to be automatically controlled from a controller 26. The controller 26 may be of any of several conventional types but preferably is of the "integrating" or "automatic reset type," such that the rate of correction of the feeder 11 is proportional to the error in weight. With controllers of this type, large errors cause the controller to produce faster corrections and the error is reduced to a negligible value under final steady-state conditions. The controller 26 is adapted to send the corrective signal to the feeder 11 by way of the signal path 27. The signal path or link 27 may be either electrical or mechanical in character such as an electrical cable, or equivalent, for transmitting an electrical signal to the feeder 11, or it may be a mechanical connection for transmitting a mechanical corrective signal to the feeder 11. Controllers of this type are well-known in the art and one example is disclosed in United States Patent No. 2,666,170—Davis.

The controller 26 is adapted to be associated with compensating means for varying the rate of feeder correction in proportion to conveyor speed so that the rate of feeder correction is inversely proportional to the time lag between the feeder 11 and the scale 20. The compensating means has been illustrated in FIG. 1 in the form of an electrical network which is in electrical circuit with the controller 26. The network includes an impedance 29 having a variable tap 30 and preferably associated with a suitable scale 28. A tachometer generator 31 is driven by way of a pulley 32, or equivalent means, in proportion to the speed of the conveyor 14 and thus the tachometer generator 31 produces an output voltage proportion to the speed of the conveyor. This voltage is applied by way of conductors 34 and 35 to the impedance 29. The conductor 34 has a positive polarity with respect to conductor 35. The impedance 29 and movable tap 30 may consist of a conventional slidewire or rheostat and be calibrated for adjustment from zero to a maximum, the units of adjustment on scale 28 being calibrated in the desired weight per unit length of conveyor, for example, pounds per foot. The tachometer generator 24 which is driven from the same mechanism that operates the counter 22 of weighing scale 20 delivers a voltage proportional to the actual flow rate passing over the weighing scale 20. This voltage is applied by conductors 36 and 37, the former having a positive polarity with respect to the latter, to a pair of resistors 39 and 40 which form a voltage divider suitable for calibrating purposes depending on the ranges desired in the system. The voltage at the tap 30 and the voltage at the junction of resistors 39 and 40 are connected by conductors 42 and 43 respectively to the automatic controller 26. The automatic controller 26 produces corrective signals by way of connection 27 to the feeder 11 which are proportional to the differences in potential between conductors 42 and 43. The direction of correction reverses as the polarity between conductors 42 and 43 reverses. Thus, when conductor 42 is positive with respect to conductor 43, the corrective signals are such as to increase the output of feeder 11 and when the polarity of conductors 42 and 43 reverses, the correction is such as to decrease the feeder output. Conductors 35 and 37 are connected by a conductor 44 to provide a common connection for proper comparison of the respective signals.

As mentioned above, the position of the adjustable tap 30 on impedance 29 represents the desired or predetermined magnitude of weight per foot on the conveyor belt 14. To obtain zero pounds per foot on belt 14, the tap 30 is connected to the end of impedance 29 which connects to conductor 35 and to obtain maximum pounds per foot on the belt 14, the tap 30 is connected to the end of impedance 29 which connects to conductor 34. With this arrangement, the tap 30 preferably is mechanically connected to a dial adjustment, or equivalent, which is linearly calibrated in the desired weight per foot.

The controller 26 preferably is a relatively high impedance device, such that relatively little current is drawn from conductors 42 and 43. Thus the voltage $V_1$ between tap 30 and the conductor 44 is proportional to the product of the desired weight per foot $W_d$ and the measured conveyor speed $S_m$. This relationship may be written in equation form as the following Equation 1:

$$V_1 = k(W_d \times S_m) \tag{1}$$

where $k$ is a proportionality factor.

The voltage $V_2$ between the junction of resistors 39 and 40 and conductor 44 represents the measured flow rate $F_m$. The measured flow rate $F_m$ is a product of two variables; namely, the measured weight per foot $W_m$ at the scale 20 and the measured conveyor speed $S_m$. This relationship may be written in equation form as the following Equation 2:

$$V_2 = k(F_m) = k(W_m \times S_m) \tag{2}$$

Accordingly, the difference between these potentials, $V_1$ and $V_2$, i.e. the difference between the potentials of conductors 42 and 43, represents the difference between the desired or predetermined weight $W_d$ and the measured weight $W_m$, that difference multiplied by the speed $S_m$ of belt 14. This will be seen by subtracting Equation 2 from Equation 1:

$$V_1 - V_2 = kS_m(W_d - W_m) \tag{3}$$

When the measured weight $W_m$ equals the desired weight $W_d$ then $$W_d - W_m = 0$$

and by substitution in Equation 3 it will be seen that $$V_1 - V_2 = 0$$

Thus the potential difference between conductors 42 and 43 is zero and this potential difference will be zero regardless of the belt speed $S_m$. However, when there is a weight error, i.e., $W_d - W_m$ is not zero, there will be a difference in potential between conductors 42 and 43 and that difference in potential, i.e. $V_1 - V_2$ will vary in exact proportion to the speed $S_m$ of belt 14. Since the rate of corrective action of the controller 26 is proportional to the potential difference it receives at conductors 42 and 43, the rate of correction of the controller 26 will also vary in exact proportion to the speed $S_m$ of belt 14. This is the proper action required to give the desired effect of optimum control at all belt speeds $S_m$ without hunting. For example, if the belt speed $S_m$ is doubled, the time lag, i.e., transportation time of the belt between the feeder 11 and the scale 20 will be reduced to one-half its former value and the control 26 will correspondingly take corrective action twice as fast for a given weight error. Accordingly, when the control settings are made for any belt speed $S_m$, they will be correct regardless of any changes that may be made in the belt speed $S_m$.

From the foregoing description of the invention it will be apparent that various modifications may be made in the compensating network without affecting the basic concept of multiplying the weight error ($W_d - W_m$) times the belt speed $S_m$. For example, the tachometer generators 24 and 31 may be of the alternating current type rather than direct current type in which case the potential between conductors 42 and 43 will be subject to a phase reversal instead of a polarity reversal when the weight error varies from high to low or vice-versa. In applications where it is not necessary to vary the desired weight per foot $W_d$ setting, a fixed voltage divider network may be substituted for the variable contact 30 to provide a constant controlled weight per foot.

Figure 2:
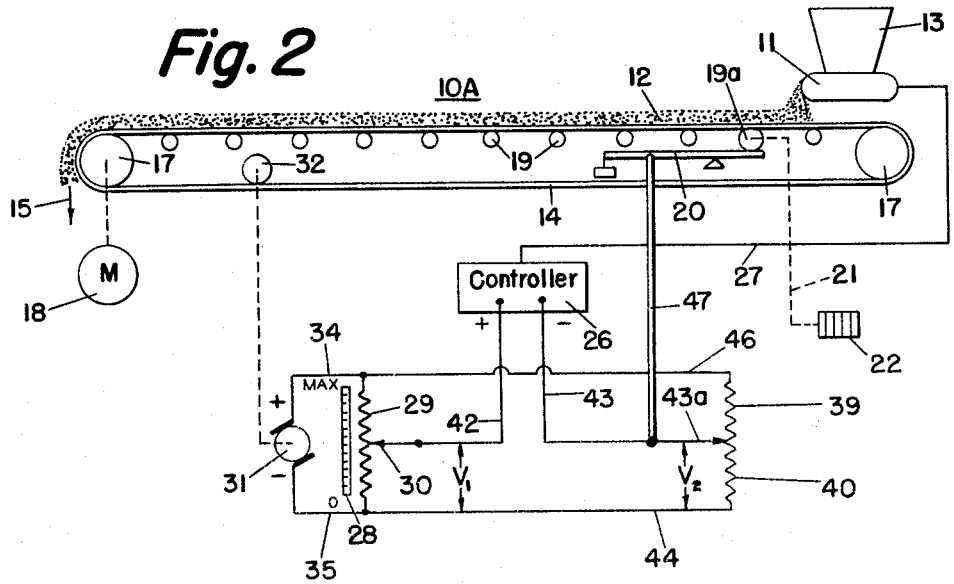
FIG. 2 is a schematic diagram of a control system embodying a modification of the invention illustrated in FIG. 1.

Referring to FIGS. 1 and 2, it will be seen that the measured flow rate signal $F_m$ appearing between conductors 36 and 37, FIG. 1, may be obtained in different ways than by the tachometer generator 24. For example, the measured flow rate signal $F_m$ may be established by multiplication of separate weight and speed measurements such as by an electrical resistance determined by a weight variable and an electrical voltage determined by a tachometer generator driven at belt speed on the conveyor belt. Such an arrangement has been illustrated in FIG. 2 where parts corresponding to those in FIG. 1 have been identified with corresponding reference characters. In FIG. 2, it will be seen that the tachometer generator 24 has been eliminated from system 10a and tachometer generator 31 provides both belt speed signals with respect to impedance 29 and resistors 39 and 40. It will be seen that the upper end of resistor 39 has been connected by a conductor 46 to conductor 34 and conductor 43 has been provided with a movable contact 43a which is adjustable relative to resistors 39 and 40 to vary the relation therebetween. The movement of contact 43a is provided by a mechanical connection 47 which extends to the scale 20 and is connected to the deflecting member thereof. Thus the contact 43a is adapted to be raised or lowered with respect to resistors 39 and 40 depending upon the weight of the material 12 on the scale 20.

While the systems 10 and 10A illustrated in FIGS. 1 and 2 may be used by themselves in applications requiring control of a constant weight per unit length of belt in spite of variations in belt speed, such systems have a further advantage in their ease of modification to provide ratio control of the material delivered at the end of the conveyor in proportion to some other primary variable. Such modification is shown in FIG. 3 by system 10B where the same compensating network illustrated in FIG. 1 is utilized with certain additional components. For purposes of clarity, the components in FIG. 3 which correspond to those illustrated in FIG. 1 have again been identified with the same reference characters.

It is frequently desirable in systems of this type to combine one stream of material with another at the discharge end of the conveyor so that there will result the control of a desired blend of the two materials. Such a system has been illustrated in combined FIGS. 3 and 3A. In FIG. 3 there has been illustrated a primary variable signal 50 which is applied in the form of a voltage between conductors 51 and 52, FIG. 3. The primary variable signal 50 represents the rate of flow $F_p$ of another stream of material 12' which the controlled flow of material 12 joins at the discharge end 15 of the conveyor so as to control the desired blend of material 12 with the second material 12'. As will be seen in FIG. 3, the second material 12' is supplied from a feeder 11' to an endless conveyor 14' to discharge end 15' of which is disposed adjacent the discharge end 15 of conveyor 14. The conveyor 14' is adapted to be driven from a motor M'. The material 12' on conveyor 14' passes over a weighing scale 20' which is mechanically connected by linkage 21' to a tachometer generator 24' which in turn produces the primary variable signal 50. The scale 20' is provided with a counter 22' which is adapted to indicate the integrated or totalized quantity of material 12' passing over the scale 20. The various components of the second conveyor may be similar to the corresponding components associated with conveyor 14 and thus they have been identified with like reference characters except for the addition of a prime. Since the counter 22 provides an indication of the totalized quantity of material passed over scale 20 on conveyor 14, and since counter 22' indicates the totalized quantity of material passing over scale 20' on conveyor 14', the combined totals appearing on indicators 22 and 22' will provide an indication of the combined flow of materials 12 and 12' at the discharge ends 15 and 15' of the conveyors.

The primary variable signal 50, as seen in FIG. 3, is applied to an impedance 54 having a variable tap or slider 55. The position of tap 55 on impedance 54 represents the desired ratio setting for the control system 10B. The ratio is zero when the tap 55 is at the lower end of impedance 54 which connects to conductor 52 and the ratio is maximum when the tap 55 is at the upper end of impedance 54 which connects to conductor 51. The position of tap 55 may be set relative to a scale 56 which preferably is calibrated in units of ratio or percentage. A conductor 57 connects with conductor 52 and a conductor 58 connects to the adjustable tap 55 so that the potential $V_3$ between conductors 57 and 58 is proportional to the desired flow rate $F_d$ of the controlled material 12, that is the primary variable flow rate $F_p$ times the percentage Y set on the ratio scale 56. This relationship may be expressed in equation form as:

$$V_3 = k(F_d) = k(Y)(F_p) \qquad (4)$$

By connection of conductor 57 to the conductor 44 and by providing an additional conductor 59 connected to conductor 42, a voltage $V_4$ appears between conductors 58 and 59 which is the subtracted difference between the desired flow rate signal $V_3$ for the controlled material and the product of the desired weight setting $W_d$ times the measured speed signal $S_m$. Expressed in equation form:

$$V_4 = V_3 - V_1 = V_3 - k(W_d \times S_m) \qquad (5)$$

This subtracted difference signal $V_4$ is applied to a second controller 60 which is adapted to send corrective signals by way of connection 61 to the variable speed conveyor drive motor 18. The controller 60 is of the same type as controller 26 and operates in the same manner as previously described for controller 26. Controller 60 makes no correction if the potential $V_4$ between conductors 58 and 59 is zero but increases conveyor speed in proportion to a potential $V_4$ such that conductor 59 is positive with respect to conductor 51 and decreases the belt speed for the reverse polarity. Since both controllers 26 and 60 are relatively high impedance devices, they do not draw appreciable current and hence neither upsets nor alters the potential appearing at the input of the other.

The operation of the network illustrated in FIG. 3 is such that a change in primary variable signal 50 causes immediate response in the flow of material 12 off the discharge end 15 of the conveyor 14 in spite of the long time delay from the feeder 11 to the discharge end 15. If the primary variable signal 50 changes, or if the ratio adjustment Y is changed, i.e., changing the position of tap 55 with respect to resistance 54, the speed controller 60 will immediately receive an error signal and will immediately correct the speed of conveyor 15 in exact proportion to the initial change. Since there are only small time lags in the variable speed drive 18, the controller 60 may be set to respond rapidly. The change in speed will not affect the weight controller 26 if it is in balance, since the potential $V_1$ between conductors 42 and 44 and the potential $V_2$ between conductors 43 and 44 will both change in exactly the same proportion to speed $S_m$ of conveyor 14. However, the speed change will alter the weight per linear foot on the conveyor 14 at the feeder end of conveyor 14 and this change in weight will later appear at the weighing scale 20 causing an error in the weight controller 26. The controller 26 will then eliminate this error by sending corrective signals to the feeder 11. Similarly, changes in the operating characteristics of the feeder 11 do not cause an error voltage to appear at the speed controller 60 but only require correction by the weight controller 26. Accordingly, the two controllers 26 and 60 operate entirely independently of each other. The speed controller 60 assumes that the weight per foot on the conveyor 14 is always correct, and based on this assumption, it controls the delivery of material 12 at the discharge end 15 of conveyor 14 at the desired or predetermined value. The weight controller 26 corrects the output of feeder 11 to deliver the same weight per foot on the belt 14 that is assumed in the calibration of the speed controller 60. The weight controller 26 always resets to the same point regardless of the speed of belt 14 but its dynamic response is proportional to belt speed as previously described. The combination of these desired actions is obtained by using the measured speed and desired weight signals $S_m$ and $W_d$ in the manner described, one set of signals sufficing for combined correct operation of both controllers 26 and 60.

Another difficulty encountered with conventional systems is that a time delay occurs between the change in belt speed and corrective action of the feeder due to the transportation delay between the feeder and the scale. If the conveyor speed increases, for example, the weight per foot of the belt at the feeder will decrease and this change will travel along the conveyor until it reaches the scale before corrective action is initiated by the scale. Accordingly, a weight error will occur for this time period and for the additional time period required for the scale to complete its corrective action. In accordance with the present invention, there is provided means for "anticipating" this action and for having the weight controller correct the feeder immediately following a change in belt speed without waiting for the weight error to appear at the scale. Such an arrangement is illustrated in the system of FIG. 4. From the following description of FIG. 4, it will be seen that an adjustable portion of the belt speed signal is applied in series with the weight controller output to produce an immediate correction of the feeder following a change in belt speed. In FIG. 4, it will be seen that the system 10C utilizes the same basic components as the system in FIG. 1 and these have been identified by corresponding reference characters.

As may be seen in FIG. 4, the voltage $V_1$ appearing between conductors 42 and 44 which is similar to the voltage appearing between those conductors in FIG. 1, also appears between conductors 65 and 66, FIG. 4, which connect an impedance 67 in parallel with the portion of impedance 29 connected between conductors 42 and 44. The impedance 67 has a variable tap or slider 68 to provide an adjustment of the magnitude of the anticipating action. The magnitude of impedance 67 is very high in relation to the magnitude of impedance 29 so that negligible current is drawn from the tap 30. The variable tap 68 is connected to one of the output terminals of a controller 26a by a conductor 70 and the other output terminal of controller 26a is connected by a conductor 71 to the feeder 11. The controller 26a in FIG. 4 is similar to controller 26 in FIG. 1 except that the controller corrective output signals, shown as a simple line 27 in FIG. 1, are shown in FIG. 4 as a voltage appearing between the two output conductors 70 and 71, conductor 71 increasing positively with respect to conductor 70 to give an increase in the rate of flow from the feeder 11. The resultant voltage $V_5$ from the anticipating adjustment of tap 68 on impedance 67 is applied, by conductor 70 from controller 26a and conductor 72, which connects to conductor 66 and the corresponding end of impedance 67, to the feeder 11 so that an increase in belt speed will call for an increase of feeder output. A change in belt speed causes an immediate proportional change in the signal to the feeder 11 and this causes a corresponding proportional change in the output of feeder 11.

If the adjustments of the magnitude of the anticipating signal $V_5$ were exactly correct, the output from feeder 11 would change in exactly correct proportion to the belt speed and no weight error would ever appear at the scale 20. However, such exactness of adjustment need not be realized and the anticipating action can be used to produce approximately the desired correction. The controller 26a will provide any necessary additional correction to complete the required change in the feeder output over and above that made by the anticipating action since it contains an integrating or automatic reset function which continues to make corrections until the weight error is zero. Thus it will be seen that the final or steady-state value of feeder output is established by controller 26a and the anticipating action applied between conductors 70 and 72 only supplies an initial estimated corrective action. The controller 26a insures final accuracy but the anticipating action provides the desired immediate response.

It is to be noted that the speed signal alone appearing between conductors 34 and 35 might be applied to impedance 67 directly and still produce the same action as far as has been heretofore described. However, if applied in that manner, the amount of anticipating signal will not be correct at different belt speeds. The reason for this is that it is the percentage of speed change that is critical and not the absolute value of speed change. Accordingly, if the weight setting is doubled for a given desired flow rate from the feeder 11 and the conveyor speed correspondingly is reduced in half, the effect of a given percentage change in belt speed would still be the same. However, a given percentage change in belt speed at one-half speed will produce only one-half as much change in voltage from the tachometer generator 31. This loss is overcome in the system of FIG. 4 by using the signal available at tap 30 which has double the position under the stated conditions. As a result, there is obtained the same amount of anticipating action for each percentage change in speed regardless of whether the flow rate is achieved by a high weight at a low speed or vice-versa.

It will be obvious that automatic controller 26a need not be of the type that delivers a voltage signal to the feeder 11 as illustrated in FIG. 4. For example, the controller 26a could position a rheostat or a mechanical speed-setting lever or the like associated with the feeder device.

FIG. 5 shows in greater detail one means of asserting control through the controller when the speed, and hence rate of feed of the material feeder 11 of the automatic control system of FIG. 1, is to be varied. Since the system is in most respects similar to FIG. 1, similar numbers have been used to designate similar parts and it will be understood that their function is the same. Involved here is a specific system between the controller 26 and the feeder 11. Specifically, the controller operates in this instance by means of a reversible motor 80 which, through an appropriate shaft and mechanical connection 81, drives a current varying rheostat 82a—82b in series with variable speed motor 83 across an appropriate power supply L1 and L2. It is the variable speed motor 83 which drives the feeder through shaft 84 and other appropriate connection. More specifically, the controller serves to provide an error signal either through line 27a to winding 80a of the reversible motor drive if the motor is to be operated in one direction or through line 27b and winding 80b if the motor is to be run in the other direction in order to correct the position of movable tap 82a with respect to slide wire or other resistance element 82b. The controller thus acts as a switching element to connect the appropriate field winding 80a or 80b across power lines L1 and L2 which also serve to supply energization to the drive motor 83. It will be appreciated that this showing is highly schematic but it is presented to show in principle one type of system of the type generally taught by Davis Patent 2,666,170.

It will be also obvious that different devices could be used to handle the anticipating signal with such controllers, such as additional amplifiers, or rheostats, or the like. The invention is also applicable to a plurality of feeders, and to a plurality of conveyors in series provided all such conveyors are driven at substantially proportional speeds.

It is to be understood that the invention is not limited to the specific arrangements shown and that further modifications may be made within the scope of the appended claims.

I claim:

1. In a system for continuously feeding material from a feeder to a continuously traveling conveyor, the improvement of means for controlling the weight of material on the conveyor uniformly in accordance with a predetermined weight comprising first measuring means responsive to the weight of the material on a section of the conveyor close to the feed end, second measuring means responsive to the speed of the conveyor, control means producing a continuous output proportional to the error in weight immediately operative to adjust the feeder output in a corrective direction and in an amount proportional to weight error to obtain the predetermined weight of material, and compensating means effective on said control means and responsive to both of said measuring means to vary the rate of feeder correction in proportion to conveyor speed, so that the rate of feeder correction is inversely proportional to the time lag between the feeder and said first measuring means.

2. The improvement according to claim 1 wherein said compensating means comprises an electrical network in circuit with said control means, said network comprising a pair of resistance means across each of which there is applied a voltage directly proportional to the conveyor speed, and circuit connections between said network and said control means such that the latter is subject to any difference in voltages across predetermined portions of said pair of resistance means.

3. The improvement according to claim 2 wherein the voltage applies to one of said resistance means is derived from said first measuring means and the voltage applied to the other said resistance means is derived from said second measuring means.

4. The improvement according to claim 2 wherein the pair of resistances provide a pair of adjustable voltage dividers whereby the difference in voltages across predetermined portions of said pair of voltage dividers is defined in equation form as $$V_1 - V_2 = S_m(W_d - W_m)$$

where $S_m$ is measured speed of said conveyor
$W_d$ is the desired weight of material on said conveyor
$W_m$ is the measured weight of material on said conveyor.

5. The improvement according to claim 1 wherein said compensating means comprises an electrical network in circuit with said control means, said network comprising first impedance means, second impedance means, means associated with said first measuring means and said first impedance means for applying to the latter a signal proportional to mass flow rate of said material, means associated with said second measuring means and said second impedance means for applying to the latter a signal proportional to conveyor speed, and circuit connections between said network and said control means to provide an input to said control means which corrects the feeder output at a rate proportional to the difference between said speed and mass flow rate signals.

6. The improvement according to claim 1 wherein said first measuring means includes means for producing a voltage proportional to the product of the measured weight of the material on the conveyor and the conveyor speed, said second measuring means including means for producing a voltage proportional to the speed of the conveyor, said compensating means comprising an electrical network in circuit with said control means, said network comprising a pair of impedance means, each providing a variable voltage divider, across each of which there is applied respectively the voltages produced by said voltage-producing means, and circuit connections between said network and said control means such that the latter is subject to any differences in voltages across predetermined portions of each of said pair of voltage dividers, the voltage across one of said predetermined portions of one of said impedance means being expressed by the following equation:

$$V_1 = k(W_d \times S_m)$$

and the voltage across said predetermined portion of said other impedance means being expressed by the following equation:

$$V_2 = k(W_m \times S_m)$$

where:

$W_d$ is the desired weight of material on the conveyor;
$W_m$ is the measured weight of material on the conveyor;
$S_m$ is the measured speed of the conveyor, and
$k$ is a proportionality constant.

7. The improvement according to claim 2 wherein said pair of resistance means are connected in parallel and each is provided with an adjustable tap electrically-connected to said control means, one of said adjustable taps is mechanically connected to said first measuring means, and said second measuring means includes voltage-producing means for applying across said pair of parallel resistances said voltage which is directly proportional to the conveyor speed.

8. The improvement according to claim 2 wherein one of said circuit connections between said network and said control means comprises an adjustable contact associated with one of said resistance means of said pair for adjustment of the desired weight of material on said conveyor.

9. In a system for continuously feeding material from a feeder to a continuously traveling conveyor, the improvement of means for controlling the weight of material on the conveyor uniformly in accordance with a predetermined weight comprising first measuring means responsive to the weight of the material on the conveyor and the speed of the conveyor adapted to generate a voltage proportional to the measured flow rate of material on the conveyor, second measuring means responsive to the speed of the conveyor and adapted to generate a voltage proportional to the speed of the conveyor, control means operative to adjust the feeder output in a corrective direction to obtain the predetermined weight of material, and compensating means effective on said control means and responsive to both of said voltage generating means to vary the rate of feeder correction in proportion to conveyor speed.

10. The improvement according to claim 9 wherein said compensating means comprises an electric network in circuit with said control means, said network comprising a pair of impedance means having a common connection therebetween, one of said impedance means having applied thereto the voltage generated by said first measuring means, the other of said impedance means having applied thereto the voltage generated by said second generating means, circuit connections respectively connecting said pair of impedance means and said control means for connecting voltages across predetermined portions of said pair of resistance means to the input of said control means so that said control means is subject to any difference in said voltages across said predetermined portions of said pair of resistance means.

11. The improvement according to claim 10 wherein said network includes a third impedance means connected in parallel with said predetermined portion of said resistance means to which is applied the voltage generated by said second measuring means, and circuit connections for connecting a portion of the voltage across said third impedance means in series with the output of said control means to produce an initial control response of said feeder immediately following a change in speed of said conveyor.

12. The improvement according to claim 1 wherein said compensating means includes anticipating means in the control means for sensing immediate speed changes and for correcting the output of said feeder initially in proportion to change in conveyor speed following by correction in a continual integrating manner in proportion to weight error.

13. The improvement according to claim 1 wherein said traveling conveyor has a variable speed drive, the improvement of controlling the mass flow rate of material on said conveyor in proportion to a primary variable, said first measuring means being adapted to produce a signal proportional to mass flow rate, said second measuring means being adapted to produce a signal proportional to conveyor speed, their measuring means adapted to produce a signal proportional to said primary variable, said compensating means and said control means being effective to correct the feeder output until said signals from said first and second measuring means are equal, and second control means operative to adjust said variable speed drive until said signals from said second and third measuring means are equal.

References Cited in the file of this patent

UNITED STATES PATENTS

| | | |
|---|---|---|
| 2,279,475 | Merrick | Apr. 14, 1942 |
| 2,990,937 | Goslin | July 4, 1961 |

FOREIGN PATENTS

| | | |
|---|---|---|
| 916,473 | Germany | Aug. 12, 1954 |